United States Patent
Kojima et al.

[11] Patent Number: 6,053,259
[45] Date of Patent: Apr. 25, 2000

[54] KNAPSACK TYPE WORKING MACHINE

[75] Inventors: Atsushi Kojima; Tomomi Nakaya; Makoto Warashina, all of Wako, Japan

[73] Assignee: Honda Giken Kogyo Kabushiki Kaisha, Tokyo, Japan

[21] Appl. No.: 09/103,594

[22] Filed: Jun. 24, 1998

[30] Foreign Application Priority Data

Jun. 27, 1997 [JP] Japan ..................................... 9-172337

[51] Int. Cl.⁷ ...................................................... B26B 27/00
[52] U.S. Cl. .......................... 173/30; 30/296.1; 173/171; 224/634
[58] Field of Search .............................. 173/30, 210, 171; 30/296.1, 276, 228; 224/261–63, 633, 634, 643; 408/20, 127; 227/8

[56] References Cited

U.S. PATENT DOCUMENTS

| | | | |
|---|---|---|---|
| 1,981,076 | 11/1934 | Sells | 224/262 |
| 3,219,129 | 11/1965 | Yamada | 173/30 |
| 3,540,123 | 11/1970 | Yamada | 173/30 |
| 3,854,204 | 12/1974 | Gonzales, Jr. | 30/228 |
| 4,145,028 | 3/1979 | Kelley et al. | 224/263 |
| 4,213,276 | 7/1980 | Jennings | 30/296.1 |
| 4,483,070 | 11/1984 | Junkermann | 30/296.1 |
| 4,572,414 | 2/1986 | Blatt | 224/262 |
| 4,662,551 | 5/1987 | Dudley et al. | 224/633 |
| 4,989,323 | 2/1991 | Casper et al. | 30/296.1 |
| 5,829,874 | 11/1998 | Breeding | 224/643 |

FOREIGN PATENT DOCUMENTS

| | | |
|---|---|---|
| 1 197 163 | 11/1959 | France . |
| 2 745 697 | 9/1997 | France . |
| 60-13849 | 5/1985 | Japan . |
| 60-50407 | 11/1985 | Japan . |
| 5-45226 | 11/1993 | Japan . |

OTHER PUBLICATIONS

Communication from European Patent Office and attached Search Report, Oct. 21, 1998.

*Primary Examiner*—Peter Vo
*Assistant Examiner*—Jim Calve
*Attorney, Agent, or Firm*—Merchant & Gould P.C.

[57] ABSTRACT

A knapsack type working machine has a first frame and a second frame. A prime mover for driving a working instrument is carried on the first frame. The second frame has a back pad and shoulder straps. The first frame and the second frame are separable from each other. The first frame has a locking engagement member. The second frame engages with the locking engagement member and has a pivotal locking member urged by a spring in a direction of engagement with the locking engagement member. By releasing the locking engagement member from engagement with the pivotal locking member, the first frame is separated from the second frame.

12 Claims, 11 Drawing Sheets

KNAPSACK TYPE WORKING MACHINE

BACKGROUND OF THE INVENTION

1. Field of the Invention

The present invention relates to an improvement in a knapsack type working machine for doing work with a prime mover carried on an operator's back, e.g., a knapsack type bush cutter for cutting down bush or weeds.

2. Description of the Related Art

Working machines conventionally put into practical uses include a portable bush cutter which has a prime mover to be carried on an operator's back and an operational rod with a cutter provided at a distal end thereof and driven by the prime mover to thereby enable bush cutting.

Such knapsack type working machines having a prime mover to be carried on an operator's back are disclosed, for example, in Japanese Patent Publication No. SHO 60-50407 entitled "KNAPSACK TYPE BUSH CUTTER", Japanese Utility Model Publication No. HEI 5-45226 entitled "KNAPSACK TYPE WORKING MACHINE" and Japanese Utility Model Publication No. SHO 60-13849 entitled "KNAPSACK TYPE COLLECTION WORKING MACHINE".

The knapsack type bush cutter disclosed in Japanese Patent Publication No. SHO 60-50407 includes a prime mover carried on a single frame, a back plate provided on a front surface of the frame, and right and left shoulder straps provided on the frame. With the straps passed over the shoulders of an operator, the frame with the prime mover supported thereon can be carried on the operator's back via the back plate during bush cutting operations.

The knapsack type working machine disclosed in Japanese Utility Model Publication No. HEI 5-45226 is featured in a detachment device for allowing detachment, when required, of a frame carrying a prime mover from an operator's back through detachment of shoulder straps from the frame.

The collection work machine disclosed in Japanese Utility Model Publication No. SHO 60-13849 has a prime mover carried on a single frame with shoulder straps so that the frame and hence the prime mover can be carried on an operator's back while collecting fallen leaves or sprinkling a chemical liquid with a jet of air generated by the prime mover.

As described above, each conventional machine is comprised of the prime mover carried on the single frame, and the shoulder straps provided on the frame so that the frame with the prime mover can be carried on the operator's back during operations thereof. In other words, the prime mover and the frame are fixedly connected together to form a single body.

In the described machines, since the prime mover and the frame having the back plate and the shoulder straps are fixedly connected together, the frame and the back plate present an obstruction to the maintenance of the prime mover, thereby making such maintenance inefficient.

For storing the machines when the latter are not in use, care must also be taken of the frame and the back plate, thereby rendering the storage tedious and time consuming. Upon storage, since the prime mover, frame, back plate and shoulder straps are all connected together, there is a fear that an oil and/or grease oozed out from the prime mover clings to the straps and back plate, thereby dirtying machine portions other than the prime mover. When the machines with those dirtied portions are stored in a small storehouse, those dirtied portions may in turn dirty the surroundings, thereby limiting the places for storage of the machines.

Further, since they include the prime mover, frame, back plate and straps connected together to form a single body, the machines are elongated and become large in overall size, thereby requiring a large storage space.

In the knapsack type working machine disclosed in Japanese Utility Model Publication No. 5-45226, the shoulder straps are designed such that they can be detached from the frame easily. However, the frame including the prime mover is fixedly Joined with the back plate and shoulder straps. Thus, the machine has the same problems as discussed above.

Consequently, arrangements are demanded in which the prime mover can be separably carried on the support frame and hence from the machine as an entirety, thereby increasing efficiency in the maintenance thereof.

The working machine with the prime mover being separable from the support frame or the machine is advantageous in that it can be stored in a small storehouse easily. With the prime mover being separable from the back plate or a back frame including the back plate and shoulder straps, it becomes possible to prevent the machine portions other than the prime mover from being dirtied by the prime mover upon storage of the machine. In addition, by virtue of the arrangements, cleaning of the prime mover, back plate and shoulder straps can be performed easily.

There is also a demand for the provision of an arrangement which allows the prime mover to be separated from the back frame instantly as if by a single touch and which is simple in construction.

SUMMARY OF THE INVENTION

According to a first aspect of the present invention, there is provided a knapsack type working machine having a prime mover designed to be carried on an operator's back and serving as a source of motive power for a working instrument, which working machine comprises a first frame for supporting the prime mover thereon, and a second frame being separate from the first frame and having shoulder straps and a back pad, the first frame and the second frame being releasably joined together.

By thus making the first frame carrying the prime mover separable from the second frame having the shoulder straps and the back pad, the prime mover becomes independent from the back pad and the shoulder straps, thereby enabling the maintenance and checking of the prime mover to be performed without being obstructed by the shoulder straps and back pad. Further, by virtue of the prime mover made separable from the back pad and the shoulder straps, the working machine can be stored easily and kept in a small storehouse.

Desirably, the working machine further comprises a locking engagement member provided on the first frame, and a pivotal locking member provided on the second frame for releasably engaging with the locking engagement member and being urged by a resilient member in a direction of engagement with the locking engagement member.

By just turning the pivotal locking member of the second frame, the first frame is released from the engagement with the locking engagement member. The prime mover can be engaged with the operator's back side by just turning the pivotal locking member of the second frame to thereby engage the latter with the former. The engagement and disengagement between the prime mover and the operator's back side can be effected by these simple operations.

In a preferred form, a prime mover stopping mechanism is disposed between the first frame and the second frame for stopping the operation of the prime mover upon separation of the first and second frames from each other. With this arrangement, the operation of the prime mover can be stopped upon separation of the first frame carrying the prime mover from the second frame on the operator's back side. This arrangement is advantageous from the standpoint of protection of the prime mover in that the prime mover stops its operation immediately the first frame is separated from the second frame. Further, since the operation of the prime mover is stopped as and when the first frame is separated from the second frame, prevention of damaging of the working instrument is enabled. Additionally, since the operation of the prime mover is initiated upon connection of the first frame to the second frame, the frame-to-frame connection can be confirmed with ease.

The prime mover may be mounted at a predetermined position on the first frame by means of a rotary member. This is advantageous in that the prime mover can be turned with the first frame carrying the same following the movements of the working instrument. This leads to a further advantage that an undesired external force is not exerted to an output port of the prime mover and to an operation rod having at a distal end thereof the working instrument, thereby enabling easy operations and protection of the prime mover.

Preferably, the second frame has resilient members for supporting the first frame. This arrangement enables damping of vibrations generated by the operation of the prime mover on the first frame and reduces the vibrations which may otherwise be transmitted from the first frame to the second frame and hence to the operator.

According to a second aspect of the present invention, there is provided a knapsack type working machine having a prime mover provided for driving a bush cutter by means of a flexible shaft and being designed to be carried on an operator's back, which working machine comprises a first frame supporting the prime mover and having a locking engagement member, and a second frame being separate from the first frame and having a back pad, shoulder straps and a pivotal locking member for releasably engaging with the locking engagement member, the first frame being separable from the second frame by releasing the locking engagement member from engagement with the pivotal locking member.

With a cutter for cutting bush, the working machine can be used as a bush cutter. Through a simple operation of effecting engagement and disengagement between the locking engagement member and the pivotal locking member, the first frame carrying the prime mover can be separated from the second frame having the shoulder straps and the back pad.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
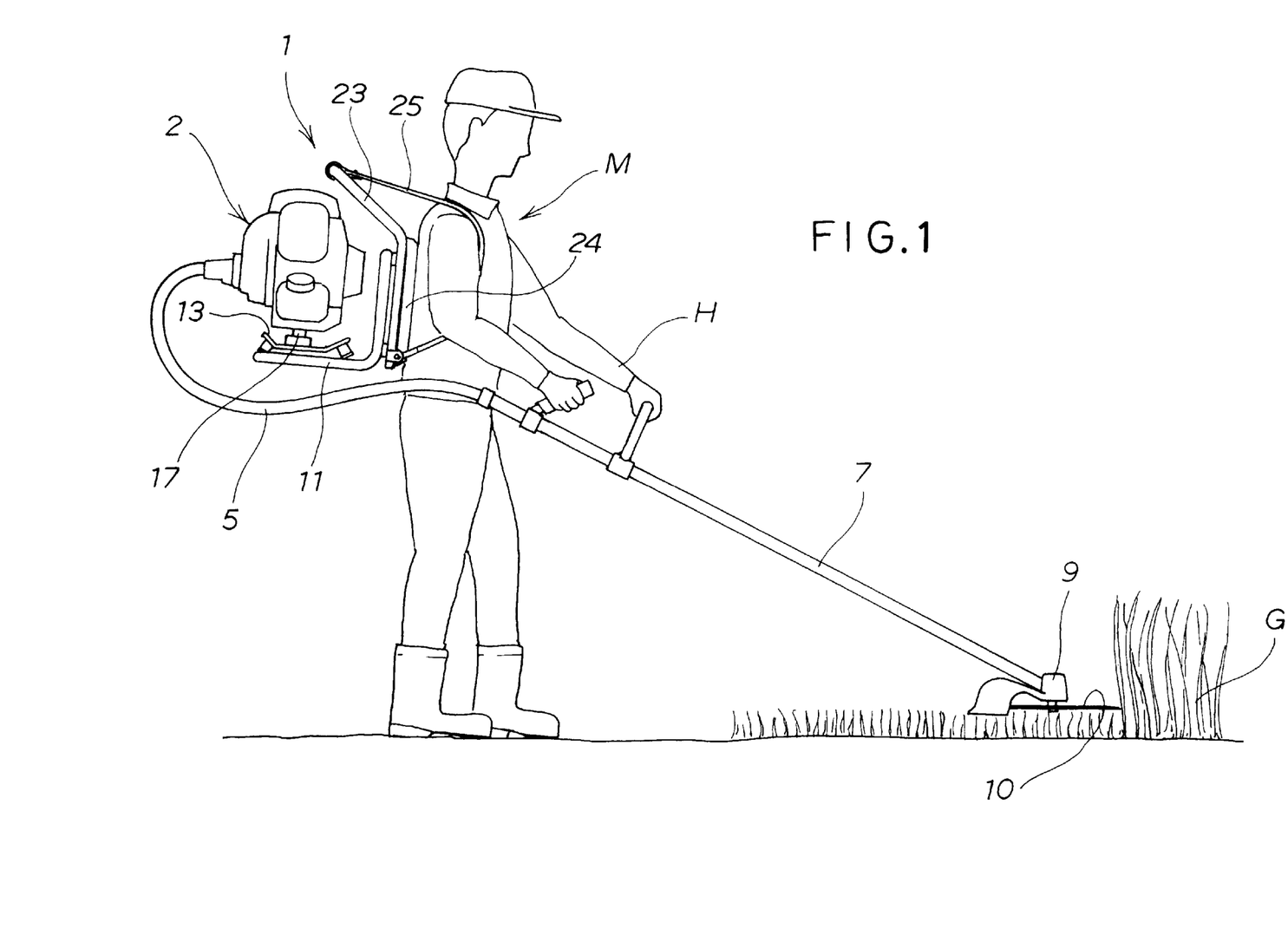
FIG. 1 is a schematic illustration of a knapsack type working machine according to the present invention, as used to cut bush away.
Figure 2:
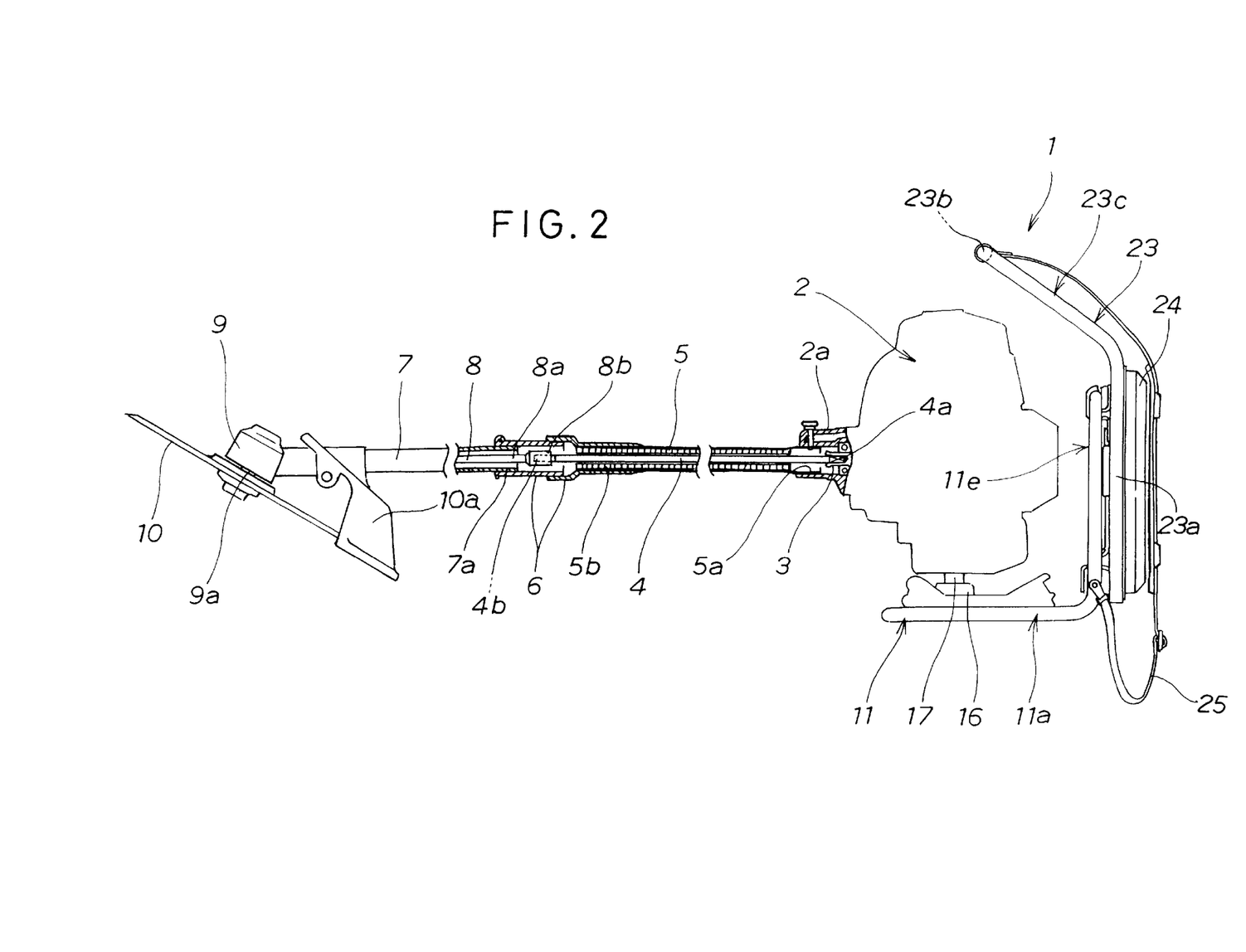
FIG. 2 is a side view illustrating partially in section the relevant portion of the working machine.

FIGS. 1 and 2 show a knapsack type working machine 1 according to the present invention, as used for cutting bush. The working machine 1 includes a prime mover 2 carried on a back of an operator M, a flexible transmission shaft 4 connected at its upstream end 4a to an output shaft 3 of the prime mover 2, a flexible tube 5 connected at its upstream end 5a to an output boss portion 2a of the prime mover 2 and surrounding an outer periphery of the flexible transmission shaft 4, a hollow operation rod 7 connected at its upstream end 7a to a downstream end 5b of the flexible tube 5 via a joint 6, and a drive shaft 8 extending through the operation rod 7 and connected at its upstream end 8a to a downstream end 4b of the flexible transmission shaft 4 via a universal joint 8b.

A gearbox 9 is provided at a lower end of the operation rod 7. A cutter 10, which serves as an instrument for performing a bush-cutting operation, is mounted to an output shaft 9a of the gearbox 9. A cover 10a is mounted on the operation rod 7 in such a manner as to partially cover the cutter 10.

The cutter 10 is attached to the operation rod 11 such that it lies substantially parallel to the ground upon cutting bush or grass G, as shown in FIG. 1. In other words, the operation rod 7 extends obliquely upwardly from the cutter 10 while the cutter 10 is inclined a predetermined angle relative to an axis of the operation rod 7 so that the operator M at an upper level than the cutter 10 can perform the bush cutting operation by holding the operation rod 7 with his hand H and moving the rod 7 to right and left directions with the cutter 10 caused to face the grass G.

Referring next to FIGS. 3 to 7, description will be made as to the construction of a frame for supporting the prime mover.

Figure 3:
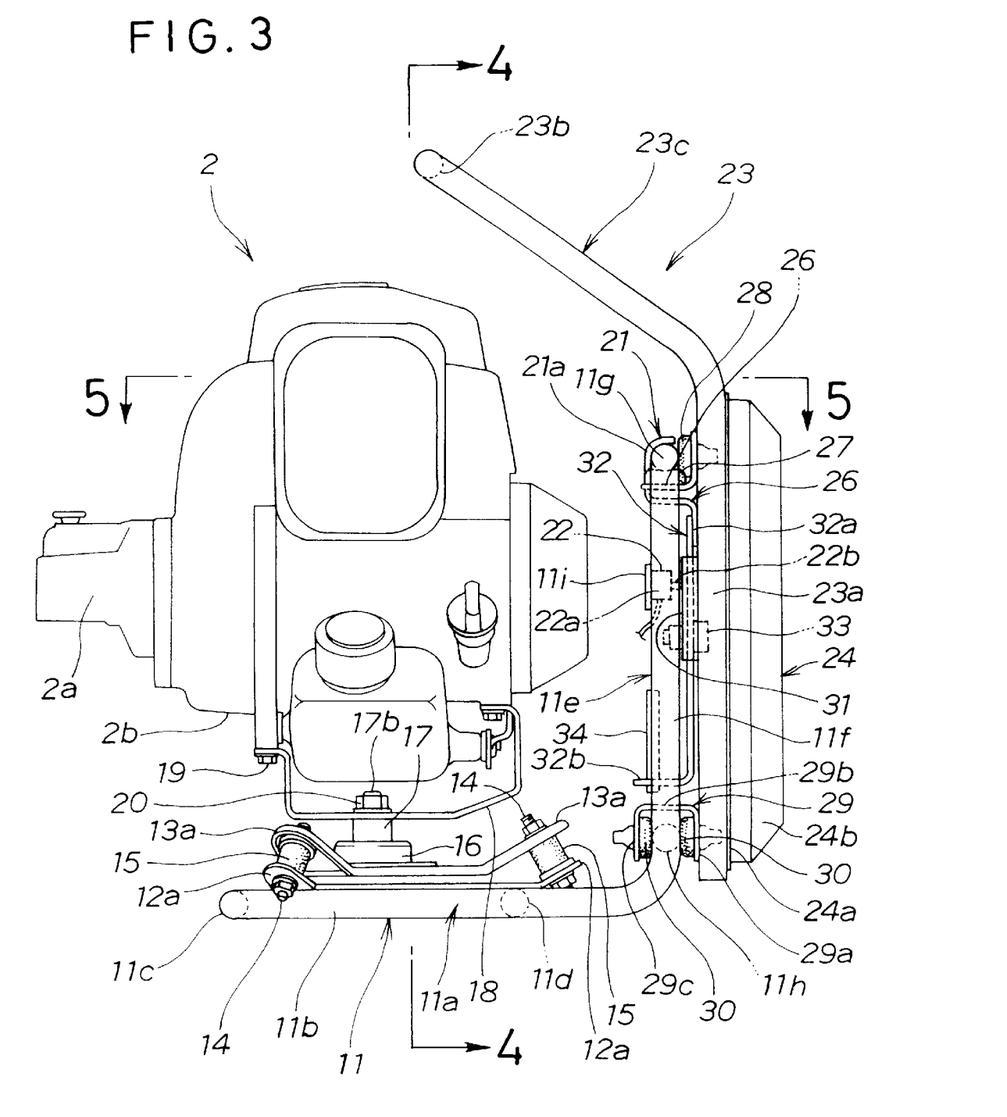
FIG. 3 is a side view of the relevant portion of the working machine for explaining a relationship between a first frame carrying a prime mover thereon and a back side second frame.

FIG. 3 shows a condition in which a first frame 11 for carrying the prime mover 2 thereon is coupled to a second frame 23 provided on a back side of the operator M. These frames 11, 23 are formed of pipes. The first frame 11 has an L-shaped configuration as viewed from sideways, formed by a horizontal portion 11a and a vertical portion 11e, as shown in FIG. 3. The overall configuration of the first frame 11 is loop-shaped as shown in FIG. 7.

Figure 7:
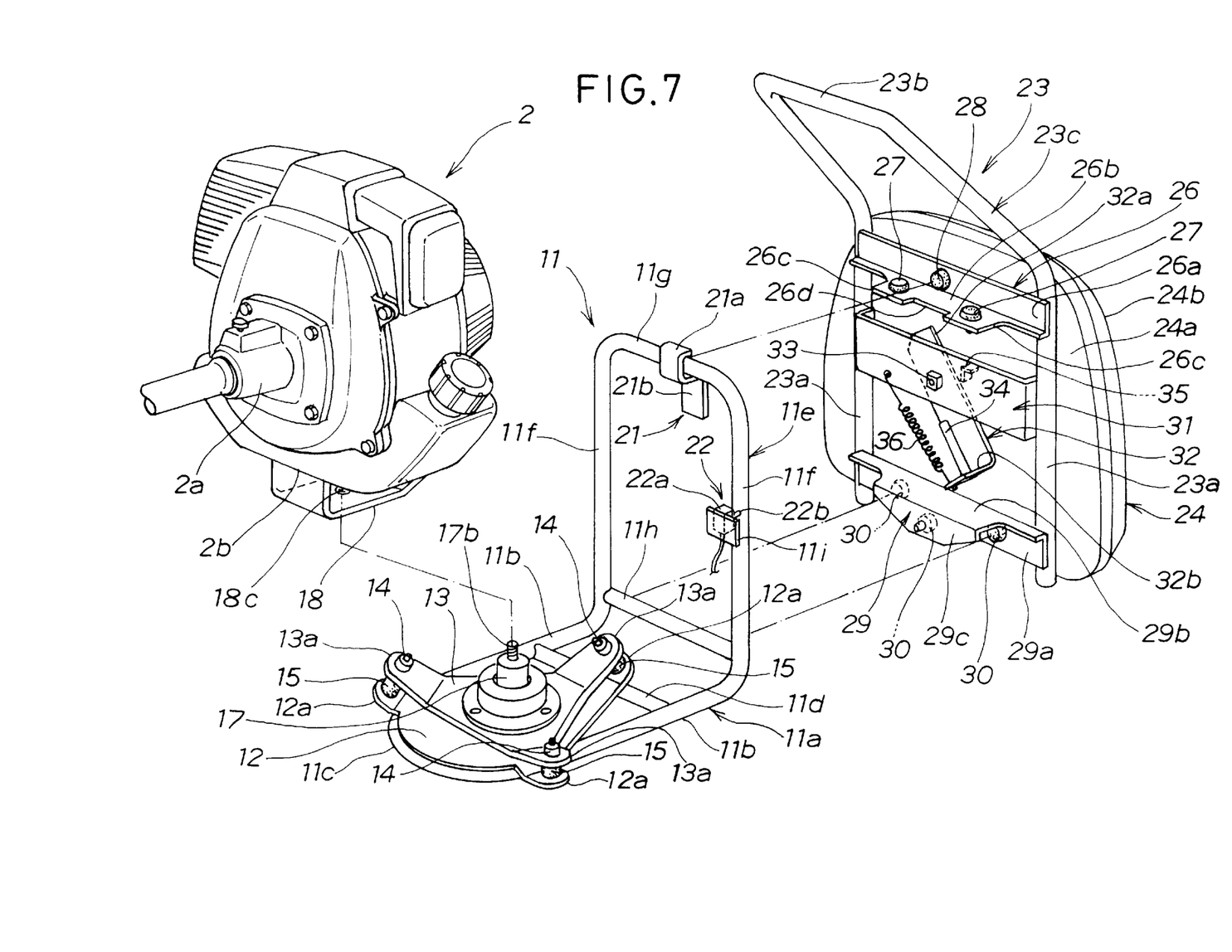
FIG. 7 is an exploded perspective view showing the interrelations of the prime mover, the first frame and the second frame.

As shown in FIG. 7, the horizontal portion 11a of the first frame 11 comprises right and left side frame portions 11b, 11b, a rear bridge frame portion 11c continuing from the rear ends of the side frame portions 11b, 11b and curved rearwardly, and a reinforcing cross frame portion 11d extending between lengthwise intermediate portions of the side frame portions 11b, 11b. The vertical portion 11e comprises right and left side frame portions 11f, 11f rising upwardly from the front ends of the right and left side frame portions 11b, 11b, an upper bridge portion 11g integrally connected to upper ends of the side frame portions 11f, 11f, and a reinforcing cross frame portion 11h laid between lower end portions of the side frame portions 11f, 11f. The first frame 11 is formed by bending a pipe material.

Figure 5:
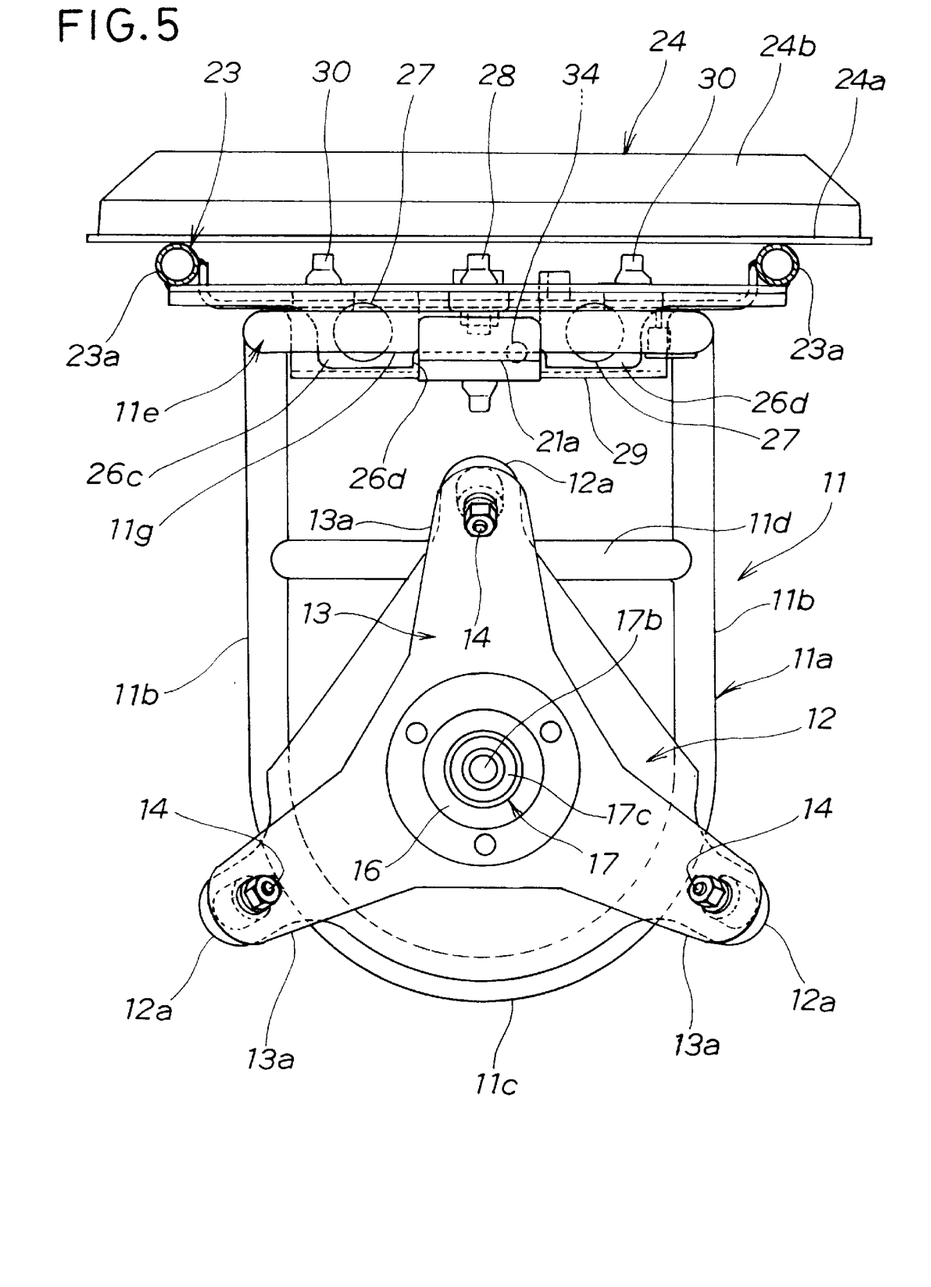
FIG. 5 is a cross-sectional view taken along line 5—5 of FIG. 3, with the prime mover removed for clarity.
Figure 6:
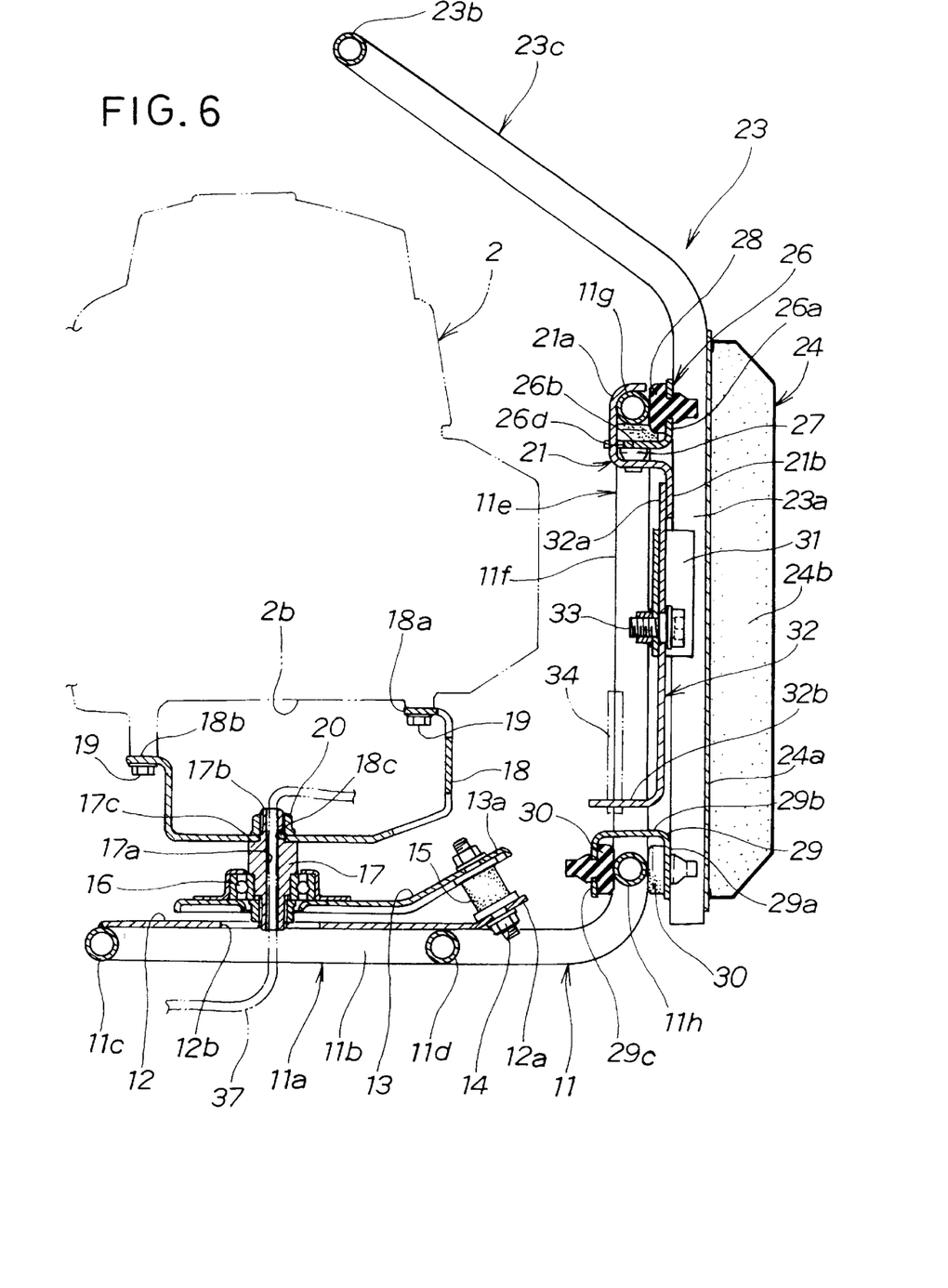
FIG. 6 is a vertical cross-sectional view illustrating the manner of engagement between the first frame and the second frame, as well as the construction wherein the prime mover is rotatably carried on the first frame.

A base plate 12 is disposed over the area from a rear part to an intermediate part of the horizontal portion 11a of the first frame 11. As shown in FIGS. 5 and 6, the base plate 12 is secured to the first frame 11 by placing the base plate 12 on the rear bridge frame portion 11c and the cross frame portion 11d and weld connecting the base plate 12 to the rear bridge frame portion 11c and the cross frame portion 11d. The base plate 12 includes right and left outwardly protruding leg portions 12a, 12a provided at a rear part thereof, and another outwardly protruding leg portion 12a provided at a front part thereof. Each leg portion 12a is formed in such a manner as to upwardly incline relative to the first frame 11.

A generally triangular prime mover supporting plate 13 is disposed on the base plate 12. The prime mover supporting plate 13 has legs 13a corresponding to the respective leg portions 12a of the base plate 12. A vibration isolation mount rubber 15 is disposed between the leg portion 12a and the leg 13a. The base plate 12 is connected to the prime mover supporting plate 13 by connecting the leg portions 12a and the legs 13a together by means of bolts and nuts 14.

In the illustrated embodiment, three radially protruding arms are provided to the prime mover supporting frame 13 to make the same light in weight. A rotary axle 17 is vertically provided at a central portion of the supporting plate 13 by means of bearings 16. The rotary axle 17 includes an axially extending internal aperture 17a through which a wire 37 for controlling the prime mover 2 extends. A threaded portion 17b of small diameter is provided at an upper portion of the rotary axle 17 and forms a stepped portion 17c at a lower end thereof.

The prime mover 2 is comprised of, for example, a gasoline engine. A mounting base 18 is attached to a bottom portion 2b of the prime mover 2 and has a channel-shaped configuration as viewed from sideways. As shown in FIG. 6, a front leg 18a forming part of a vertical portion of the mounting base 18 is secured to a front portion of the bottom portion 2b of the prime mover 2 by means of a bolt 19 while a rear leg 18b is secured to a rear portion of the bottom portion 2b of the prime mover 2. With this arrangement, the prime mover 2 is fixedly mounted to the mounting base 18.

A mounting aperture 18c for mounting the rotary axle 17 is formed in a bottom of the mounting base 18. Namely, the mounting base 18 is mounted on the rotary axle 17 by inserting the threaded portion 17b from below into the mounting aperture 18c to thereby bring the stepped portion 17c into engagement with a periphery of the mounting aperture 18c and then screwing a nut 20 over the threaded portion 17b to fasten the mounting base 18 to the rotary axle 17.

The prime mover 2 is thus mounted to the supporting plate 13 of the first frame 11 by means of the rotary axle 17 and the mounting base 18 in the manner as stated above. The prime mover 2 is supported at three points on the first frame 11 through the mount rubbers 15. Therefore, vibration arising from the operation of the prime mover 2 is absorbed by the mount rubbers 15, thereby preventing transmission of the vibration to the first frame 11.

As stated above, since the prime mover 2 is mounted to the first frame 11 by means of the rotational shaft 17, the prime mover 2 is rotatable about the rotary axle 17 relative to the first frame 11.

As shown in FIG. 1, when the operator M, with the prime mover 2 carried on his back, performs a bush cutting operation by swinging the operation rod 7 to the right and left, the flexible tube 5 connected to the operation rod 7 swingingly flexes to the right and left. In this instance, since the prime mover 2 rotates about the rotary axle 17 relative to the first frame 11, an excessive force or twisting force produced by operating the operation rod 7 does not act on the flexible tube 5.

Depending on the operational position of the operation rod 7, it becomes necessary to swing move the operation rod 7 to the right and left against a tension of the flexible tube, thereby making the bush cutting operation difficult to achieve. Even in this instance, since the prime mover 2 is rotatable as described above, it moves in correspondence with the movements of the operation rod 7, thereby making it easy for the operator M to perform the bush cutting operation with the prime mover 2 carried on his back.

As shown in FIG. 6, there is provided an opening 12b formed in the base plate 12b to cause the lower portion of the rotary axle 17 to face the opening 12b, and hence it becomes possible for a lower portion of the rotary axle 17 to avoid interfering with the base plate 12. The wire 37 is guided to the side of the operation rod via the opening 12b.

As shown in FIGS. 3, 6 and 7, a locking engagement member 21 for locking the first frame 11 to the second frame 23 is provided at a longitudinal center of the upper bridge portion 11g extending between the upper ends of the right and left side frame portions 11f, 11f of the vertical portion 11e of the first frame 11.

The locking engagement member 21 has a predetermined width in the longitudinal direction of the upper bridge portion 11g and includes a recessed portion 21a provided at an upper portion thereof and facing forwardly, that is, opening toward the second frame 23. The forwardly facing recessed portion 21a is caused to receive the upper bridge portion 11g, whereby the locking engagement member 21 is fixedly secured to the upper bridge portion 11g. The locking engagement member 21 has a locking portion 21b extending a predetermined distance downwardly. The locking portion 21b is capable of engaging with and disengaging from a pivotal locking member 32, discussed below, to thereby effect the engagement and disengagement between the first frame 11 and the second frame 23.

The first frame 11 has a prime mover stopping mechanism for stopping operation of the prime mover 2 upon separation of the first frame 11 from the second frame 23. More particularly, the prime mover stopping mechanism is provided at either of the right and left side frame portions 11f, 11f of the vertical portion 11e of the first frame 11. Since a gasoline engine is employed as the prime mover in the embodiment being described, a kill switch 22 is provided for stopping the operation of the engine. The kill switch 22 has a switch body 22a attached to one side frame portion 11f via a stay 11i. A detection rod 22b of the switch 22 protrudes forwardly from the side frame portion 11f.

Figure 4:
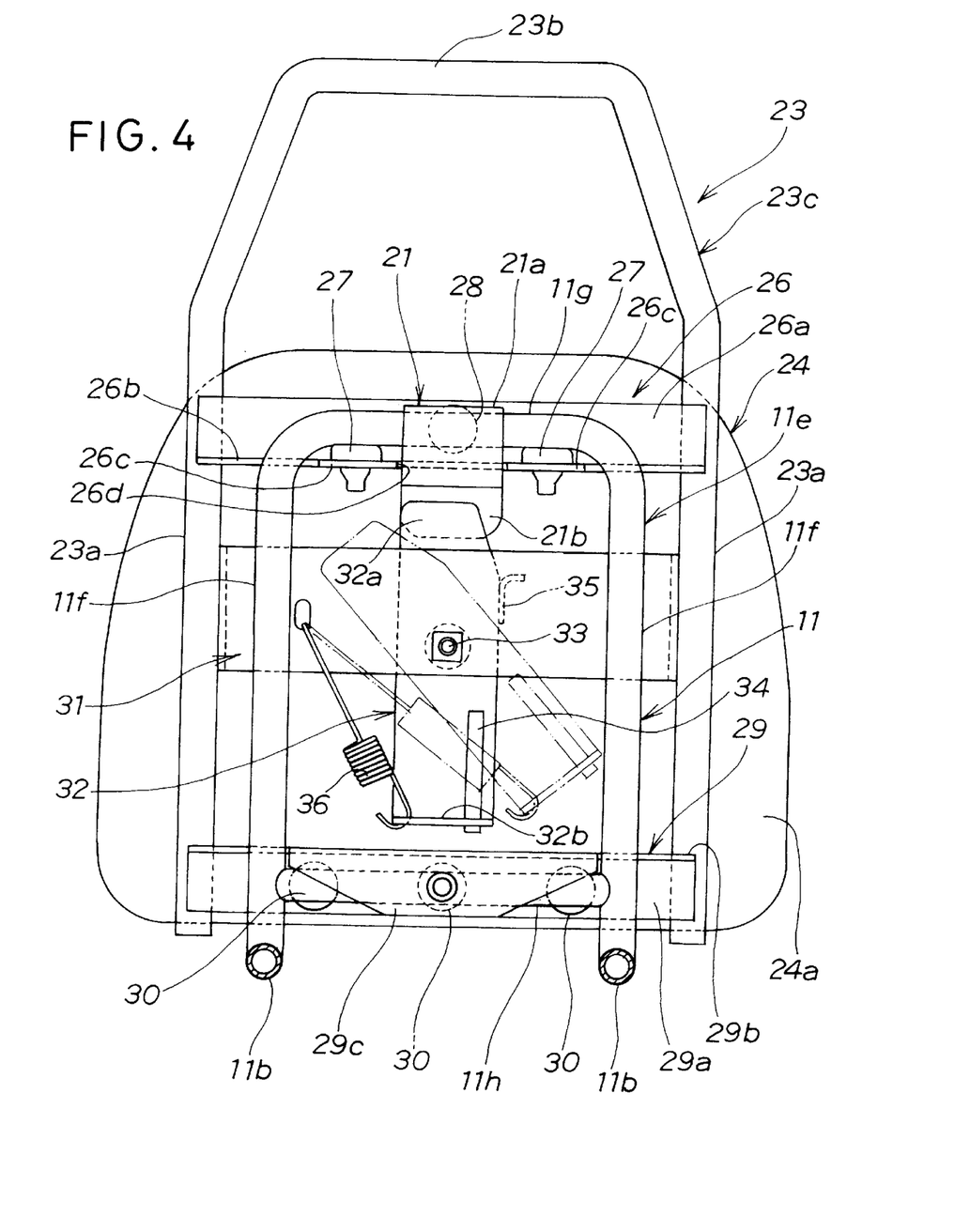
FIG. 4 is a cross-sectional view taken along line 4—4 of FIG. 3, with the prime mover removed for clarity.

The second frame 23 has an inverted channel configuration as viewed in front and rear elevations. The second frame 23 comprises longitudinally elongated right and left side frame portions 23a, 23a, and a bridge portion 23b extending between upper ends of the side frame portions 23a, 23a, all of which are formed by bending pipe materials. The second frame 23 is higher than the first frame 11 as shown in FIGS. 3 and 4. The interval between the side frame portions 23a, 23a of the second frame 23 is sufficiently greater than the width between the side frame portions 11f, 11f of the first frame 11. An upper half portion of the second frame 23, i.e. a part upwardly extending beyond the first frame 11 is bent backwardly and forms a guard portion 23c positioned above the prime mover 2 when the first frame 11 and the second frame 23 are assembled together.

On a front side of the second frame 23, there is provided a back pad 24. As shown in FIG. 6, the back pad 24 comprises a base plate 24a positioned rearwardly thereof and a pad portion 24b positioned forwardly thereof and enclosing a cushioning material. As best shown in FIGS. 1 and 2, the right and left shoulder straps 25 have right and left lower ends connected to respective lower portions of the right and left side frame portions 23a, 23a of the second frame 23, and right and left upper ends connected to opposite ends of the bridge portion 23b so that the second frame 23 together with the first frame 11 can be carried on the back of the operator M. For shouldering the second and first frames 23, 22 and hence the machine 1, the operator's arms are slipped into spaces between the straps 25 and the second frame 23 until the straps 25 come over the shoulders of the operator M.

As shown in FIG. 3, an upper support stay 26 is provided at an upper part of a rear surface of a lower half portion of the second frame 23. The upper support stay 26 is laid between upper portions of lower half portions of the right and left side frame portions 23a, 23a. The upper supporting stay 26 has an inverted L-shaped section and is fixedly secured to the second frame 23 by weld connecting opposite ends of a vertical portion 26a thereof to the side frame portions 23a, 23a, as shown in FIGS. 3, 6 and 7. A horizontal portion 26b of the support stay 26 protrudes backwardly and includes shelf portions 26c, 26c formed integrally therewith and spaced from each other sideways. The shelf portions 26c, 26c jointly form a recessed portion 26d therebetween.

The respective shelf portions 26c, 26c have upwardly projecting resilient members 27, 27 formed on an upper surface of the upper support stay 26. Each resilient member 27, 27 is made of a rubber material and has an upper half part projecting upwardly and a lower half part engaged and held in a locking opening formed in the shelf portions 26c, 26c. A resilient member 28 is provided centrally on the vertical portion 26a of the upper support stay 26. The resilient member 28 is disposed between the right and left resilient members 27, 27 and protrudes backwardly.

Between the lower portions of the left and right side frame portions 23a, 23a of the second frame 23, there is provided a lower support stay 29, which has a downwardly opening channel-shaped configuration in cross section and is fixedly secured to the second frame 23 by weld connecting opposite ends of a front portion 29a thereof to the lower portions of the side frame portions 23a, 23a. An upper portion 29b of the lower support stay 29 has a rear portion 29c extending downwardly from a rear part thereof and having a lengthwise width set such that the lower support stay 29 can be inserted between the right and left side frame portions 11f, 11f of the first frame 11. A resilient member 30 is provided centrally of the rear portion 29c in such a manner as to protrude forwardly. The front portion 29a is provided with resilient members 30, 30 spaced from each other sideways and protruding backwardly.

A support plate 31 is laid between the upper and lower support stays 26, 29 on the rear surface of the second frame 23. The support plate 31 has a U-shaped configuration as viewed from above, as shown in FIG. 7, and is fixedly secured to the second frame 23 by weld connecting opposite ends thereof to the right and left side frame portions 23a, 23a. The support plate 31 is disposed substantially centrally of the side frame portions 23a, 23a so that it is located closer to the upper support stay 26 than to the lower support stay 29.

Pivotal locking member 32 is attached to a longitudinally central part of the support plate 31. The pivotal locking member 32 takes the form of an elongate plate and has an upper half pivotable about a support axle 33 relative to the support plate 31. The pivotal locking member 32 is disposed on a front side of the support plate 31, that is, a side opposed to the pad 24.

In an erected state as shown in FIGS. 3, 4 and 6, the pivotal locking member 32 has a length set so that an engaging portion 32a at an upper portion thereof projects upwardly beyond the support plate 31 by a predetermined length. The pivotal locking member 32 has a shelf portion 32b formed by bending a lower end thereof, positioned below the support plate 31, backwardly through 90 degrees. As shown in FIG. 4, a rod-shaped engagement releasing handle 34 is vertically disposed on the shelf portion 32b at a position displaced rightward.

A spring 36 for urging the pivotal locking member 32 into engagement with the locking engagement member 21 is suspended between one end of the shelf portion 32b of the pivotal locking member 32 and a portion of the support plate 31. On the front side of the support plate 31, there is provided a stopper 35 for retaining the pivotal locking member 32 urged by the spring 36 at the engagement position thereof.

The upper bridge portion 11g of the first frame 11 is placed on the shelf portions 26c, 26c of the upper support stay 26 of the second frame 23 via the resilient members 27, 27, as shown in FIG. 4. The upper bridge portion 11g includes a front surface abutting against the resilient member 28. The upper support stay 26 supports the upper bridge portion 11g so as to prevent the upper bridge portion 11g from falling down therefrom.

At that time, a lower portion of the recessed portion 21a of the locking engagement member 21 of the first frame 11 is fitted into the recessed portion 26d of the upper supporting stay 26 of the second frame 23, thereby positioning the first and second frames 11, 23.

The cross frame portion 11h of the first frame 11 is inserted into a downward open space of the lower support stay 29 provided at the lower portion of the rear surface of the second frame 23 and thus securely interposed between the front and rear resilient members 30. The cross frame portion 11h is thus supported by the lower support stay 29.

The locking portion 21b of the locking engagement member 21 fixed at the upper bridge portion 11g of the first frame 11 engages the engaging portion 32a of the pivotal locking member 32 of the second frame 23. In this instance, as shown in FIG. 6, the engaging portion 32a of the pivotal locking member 32 makes a close contact with a rear surface of the locking portion 21b of the locking engagement member 21 to thereby provide locking engagement between the locking engagement member 21 and the pivotal locking member 32.

As shown in FIG. 4, the pivotal locking member 32 is urged clockwise by the spring 36 about the support axle 33. However, rotation of the pivotal locking member 32 is restricted by the stopper 35, whereby the pivotal locking member 32 is kept in engagement with the locking engagement member 21, as shown in FIG. 4. Thus, the engagement between the pivotal locking member 32 and the locking engagement member 21 restricts a front-and-rear movement of the upper bridge portion 11g of the first frame 11, and hence the first frame 11 is brought into locking engagement with the second frame 23. At this time, the kill (shutoff) switch 22, provided at either of the side frame portions 11f, 11f of the first frame 11, causes the prime mover 2 to be operable as the detecting rod 22b thereof comes into abutment against a rear surface, which is positioned before the detecting rod 22b, of the supporting plate 31 of the second frame 23.

With the first frame 11 and the second frame 23 coupled together as described above and the working machine 1 carried on the operator's back using the straps 25, the bush cutting operation can be performed as shown in FIG. 1.

The first frame 11 carrying the prime mover 2 thereon is coupled via the resilient members 27, 28, 30 to the second frame 23. The vibration arising from the operation of the prime mover 2 may be attenuated by the above-mentioned mount rubbers 15. However, the vibration of the prime mover 2 transmitted to the first frame 11 can be absorbed by the resilient members 27, 28, 30, thereby preventing transmission of the vibration to the second frame 23 carried on the back of the operator. The vibration arising from the operation of the prime mover is thus prevented from being transmitted to the operator with the result that fatigue of the operator can be reduced and prolonged bush cutting is enabled.

Next, operation for separating the prime mover 2 from the support frame unit of the working machine will be described.

The engagement releasing handle 34 for releasing the engagement between the first frame 11 and the second frame 23 Is positioned closely to a right side of the back of the operator.

For detaching the prime mover 2 from the working machine 1 while the latter is carried on the back of the operator, a right hand of the operator is brought to his back side to pull the handle 34 against a rotational force of the pivotal locking member 32 produced by the spring 36 to cause the pivotal locking member 32 to rotate counterclockwise about the support axle 33, as shown in FIG. 4. As a result, the upper engaging portion 32a of the pivotal locking member 32 is removed from the locking portion 21b of the locking engagement member 21 of the first frame 11, thereby releasing engagement between the locking engagement member 21 and the pivotal locking member 32. The condition wherein the engagement between the locking engagement member 21 and the pivotal locking member 32 is released is shown by phantom line in FIG. 4.

Figure 8:
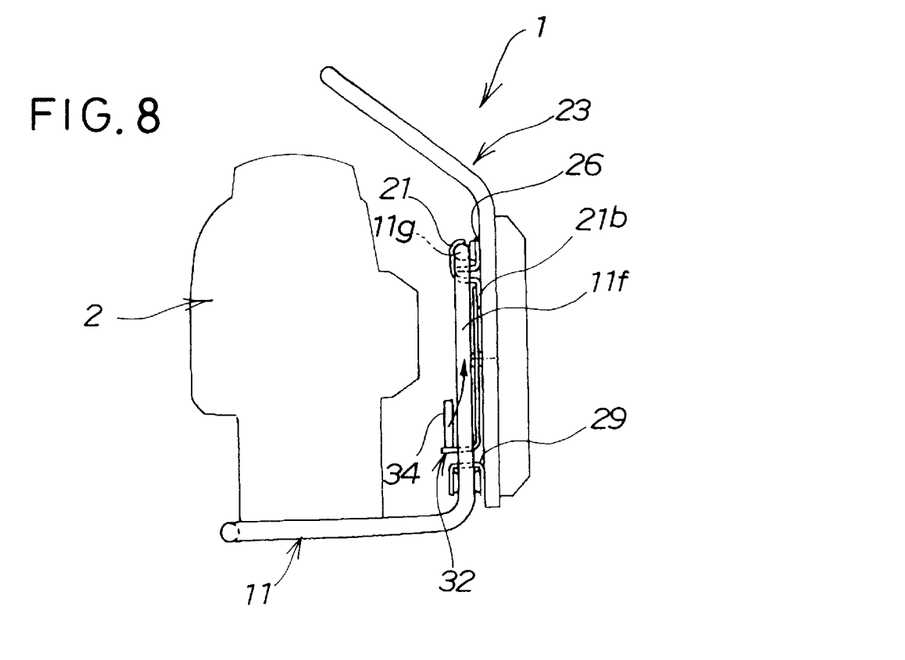
FIG. 8 is a schematic side view showing how the first frame provided on the prime mover side is released from engagement with the second frame and lifted up.
Figure 9:
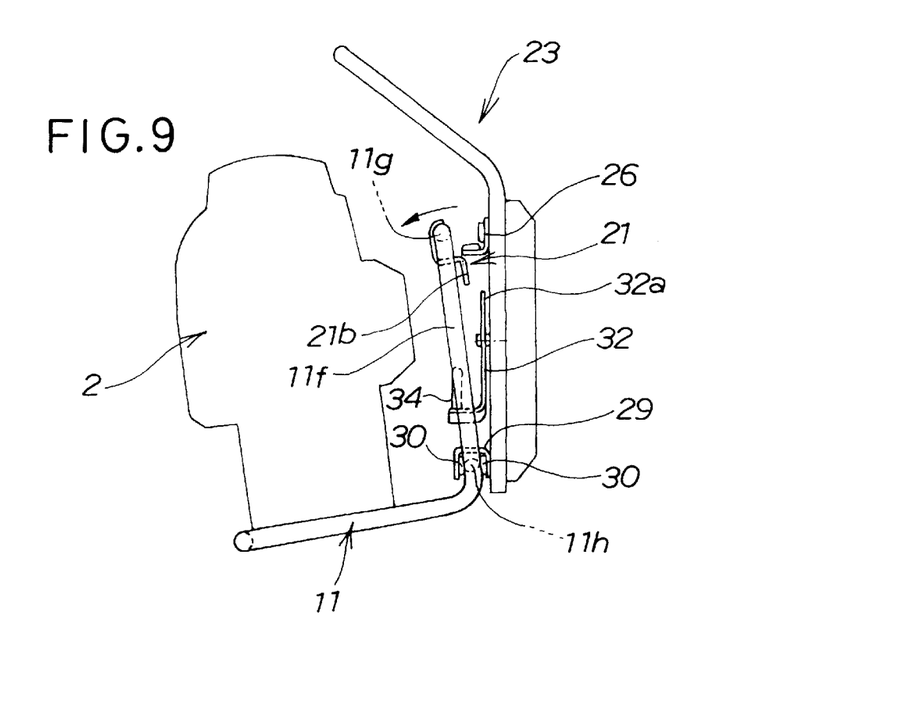
FIG. 9 is a schematic side view showing an upper part of the first frame as being separated from the second frame.
Figure 10:
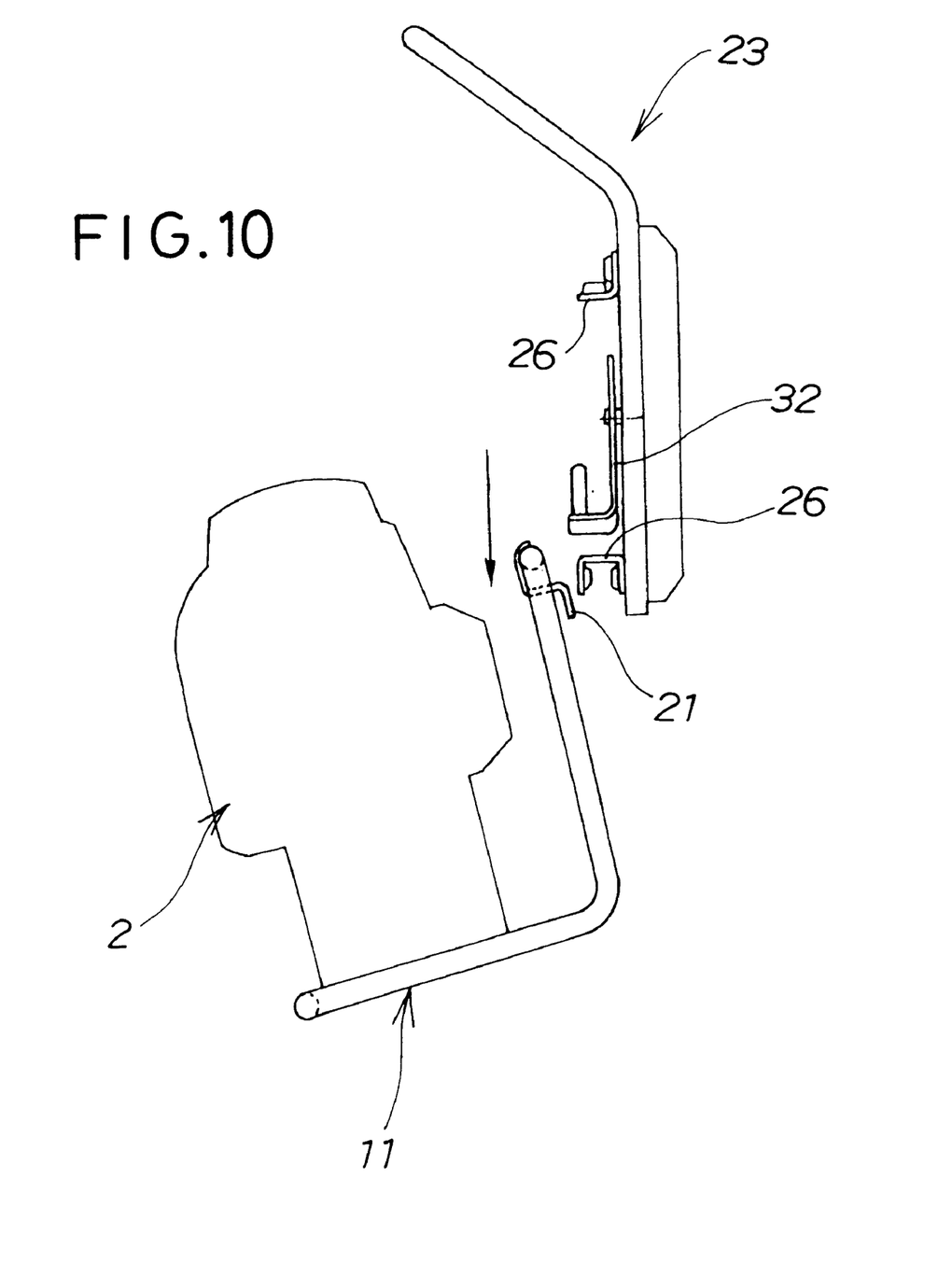
FIG. 10 is a schematic side view showing the first frame as completely separated from the second frame.

FIGS. 8 through 10 show how the first frame 11 carrying the prime mover 2 thereon is separated from the second frame 23 on the operator's back side.

FIG. 8 shows a condition wherein the first frame 11 is coupled with the second frame 23. In this condition, the engagement releasing handle 34 is operated to turn the pivotal locking member 32 in a counterclockwise direction, thereby releasing the pivotal locking member 32 from the engagement with the locking engagement member 21. The first frame 11 carrying the prime mover 2 is thereafter lifted up as indicated by an arrow of FIG. 8. The lift of the first frame 11 may be performed by either the operator with his hand brought to his back side, or an assistant standing behind the former.

By thus lifting the first frame 11 up, the upper bridge portion 11g of the first frame 11 is lifted upwardly and then moved away from the upper support stay 26 of the second frame 23, as shown in FIG. 9. Consequently, since the cross frame portion 11h provided at the lower part of the right and left side frame portions 11f, 11f is supported by the resilient members 30 of the lower support stay 29 of the second frame 23 in a front-and-rear direction thereof, the first frame 11 is backwardly pivotable about the support portion as a fulcrum, as indicated by an arrow of FIG. 9.

Thereafter, the first frame 11 carrying the prime mover 2 is completely separated from the second frame 23 by withdrawing the cross frame portion 11h of the first frame 11 downwardly from the lower supporting stay 29, as shown in FIG. 10.

Even when the working machine 1 is not carried on the operator's back, the disengagement and separation of the first frame 11 from the second frame 23 can be achieved by rotating the pivotal locking member 32 with the engagement releasing handle 34 to thereby release the pivotal locking member 32 from the engagement with the locking engagement member 21, followed by withdrawing the cross frame portion 11h from the lower support stay 29, as described above.

As thus far explained, the first frame 11 carrying the prime mover 2 can be released from the engagement with the second frame 23 by the easy operation which requires only turning the pivotal locking member 32 against the force of the spring 36 to thereby release the pivotal locking member 32 from the engagement with the locking engagement member 21.

In FIG. 7, the kill switch 22, which is provided at either of the side frame portions 11f, 11f of the first frame 11 carrying the prime mover 2 thereon, keeps the prime mover 2 in operation as an end of the detecting rod 22b thereof abuts against the rear surface of the supporting plate 31 of the second frame 23. However, when the first frame 11 is separated from the second frame 23, the detecting rod 22b is released from the abutment against the support plate 31 of the second frame 23 to thereby stop the operation of the prime mover 2. That is, the prime mover 2 stops its operation immediately the first frame 11 is separated from the second frame 23.

Figure 11:
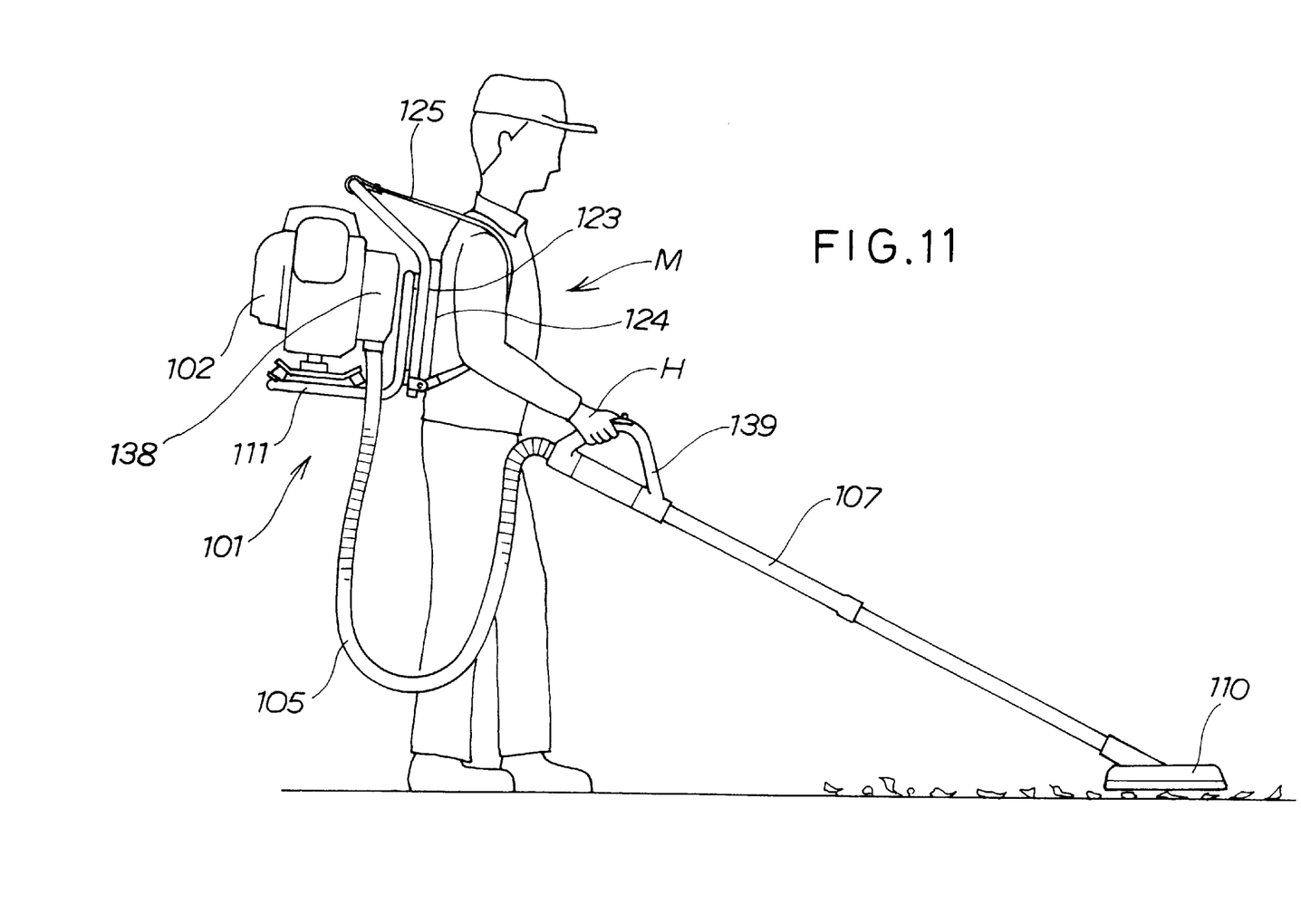
FIG. 11 schematically shows the knapsack type working machine as used for collecting, e.g., fallen leaves.

FIG. 11 shows an example use of the working machine as a collection work machine 101 for collecting fallen leaves by suctioning the latter.

As shown in FIG. 11, the collection work machine 101 comprises a first frame 111 carrying a prime mover 102 thereon and a second frame 123 releasably engaged with the first frame 111 by means of the locking member and pivotal locking member as shown in FIG. 7.

The second frame 123 has a back pad 124 and shoulder straps 125 and is designed so that the operator M can carry the machine 101 on his back.

A collecting portion 138 for accommodating the sucked fallen leaves is attached to an output portion of the prime mover 102. The collecting portion 138 is connected to a flexible hose 105, which in turn is connected at its one end to a collecting pipe 107 having a handle 139. The collecting pipe 107 includes a sucking nozzle 110 at its one end.

By using the collection work machine 101, fallen leaves are collected as shown in FIG. 11. With the collection work machine 101 carried on his back and the handle 139 held by his hand H, the operator M operates the collecting pipe 107 to thereby collect the fallen leaves.

Figure 12:
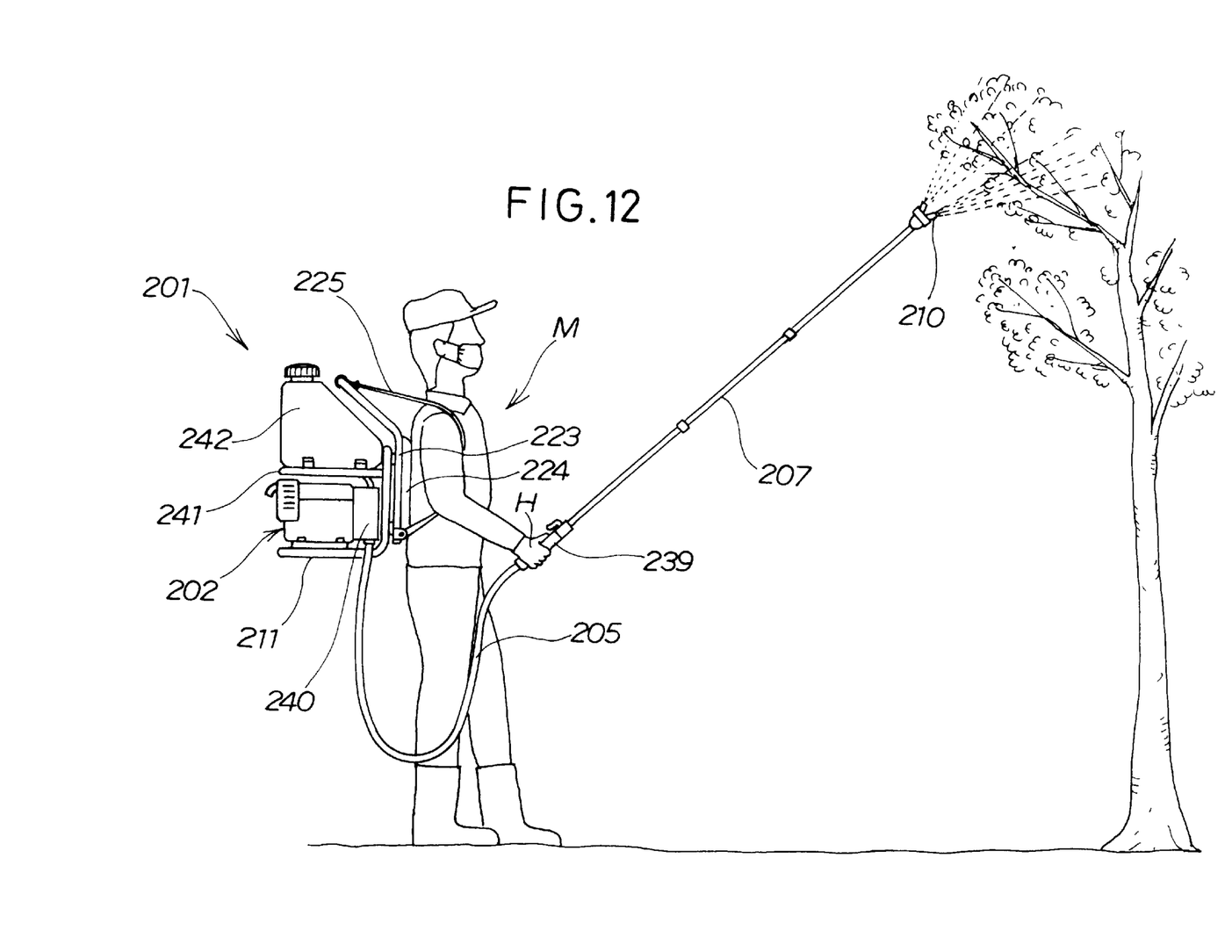
FIG. 12 schematically shows the knapsack type working machine as used for sprinkling liquid-form chemical agents.

FIG. 12 shows use of the inventive working machine as a chemical agent liquid sprinkling machine 201.

As shown in FIG. 12, the sprinkling machine 201 comprises a first frame 211 carrying a prime mover 202 thereon, and a second frame 223 releasably engaged with the first frame 211 by means of the locking and pivotal locking members as shown in FIG. 7. The second frame 223 includes a back pad 224 and shoulder straps 225 and is arranged so that the operator M can carry the machine 201 on his back.

The prime mover 202 is carried on the first frame 211 which has a support stay 241 positioned above the prime mover 202. Provided on the support stay 241 is a chemical liquid tank 242.

A compressor 240 is attached to an output portion of the prime mover 202. The compressor 240 pressurizes a chemical liquid replenished from the chemical liquid tank 242. A flexible hose 205 is connected to a discharge portion of the compressor 240. The flexible hose 205 is connected at its one end to a chemical liquid sprinkling pipe 207. The chemical liquid sprinkling pipe 207 has a handle portion 239 provided upstream thereof, and a sprinkling nozzle portion 210 attached to one end thereof. With the handle portion 239 held by a hand H, the pressurized chemical liquid is sprinkled from the sprinkling nozzle portion 210 against a tree, etc.

In the described use, both the chemical liquid tank 242 and the prime mover 202 are supported on the first frame 211. Thus, the chemical liquid tank 242 and the prime mover 202 are separated from the second frame 223 on the operator's back side as the first frame 211 is separated from the second frame 223.

Although the present invention has been described in relation to one exemplary knapsack type working machine, it should be appreciated that the present invention can be applied to all kinds of knapsack type working machines with a prime mover designed to be carried on an operator's back. Although the prime mover has been described as a gasoline engine in the embodiments, it may also be an electric motor.

Obviously, various minor changes and modifications of the present invention are possible in the light of the above teaching. It is therefore to be understood that within the scope of the appended claims, the present invention may be practiced otherwise than as specifically described.

What is claimed is:

1. A knapsack type working machine having a prime mover designed to be carried on an operator's back and serving as a source of motive power for a working instrument, said working machine comprising:

a first frame for supporting said prime mover thereon;

a second frame being separate from said first frame and having shoulder straps and a back pad, said first frame and said second frame being releasably joined together;

a locking engagement member provided on said first frame, and a pivotal locking member provided on said second frame for releasably engaging with said locking engagement member and being urged by a resilient member in a direction of engagement with said locking engagement member; and a prime mover stopping mechanism disposed between said first frame and said second frame for stopping operation of said prime mover upon separation of said first and second frames from each other;

wherein said second frame has resilient members for supporting said first frame, said resilient members projecting in a direction such that said resilient members are disposed between said first and second frames coupled together, wherein said locking engagement member and said pivotal locking member are disposed behind said back pad when viewed from the operator's back, and wherein said prime mover stopping mechanism includes a switch provided on one of said first and second frames and operatively connected to said prime mover for disabling operation of said prime mover when activated, said switch having a detection rod projecting from said one frame toward the other frame and normally engaged with said other frame for detecting separation of said first and second frames from each other so as to activate said switch.

2. A knapsack type working machine according to claim 1, wherein said prime mover is mounted at a prime mover mount position of said first frame by means of a rotary member.

3. A knapsack type working machine having a prime mover provided for driving a bush cutter by means of a flexible shaft and being designed to be carried on an operator's back, said working machine comprising:

a first frame supporting said prime mover and having a locking engagement member;

a second frame being separate from said first frame and having a back pack, shoulder strap and a pivotal locking member for releasably engaging with said locking engagement member, said first frame being separable from said second frame by releasing said locking engagement member from engagement with said pivotal locking member; and a prime mover stopping mechanism disposed between said first and second frames for stopping operation of said prime mover upon separation of said first and second frames from each other, wherein said pivotal locking member is urged by a resilient member in a direction of engagement with said locking engagement member, wherein said second frame has resilient members for supporting said first frame, said resilient members projecting in a direction such that said resilient members are disposed between said first and second frames coupled together, wherein said locking engagement member and said pivotal locking member are disposed behind said back pad when viewed from the operator's back, and wherein said prime mover stopping mechanism includes a switch provided on one of said first and second frames and operatively connected to said prime mover for disabling operation of said prime mover when activated, said switch having a detection rod projecting from said one frame toward the other frame and normally engaged with said other frame for detecting separation of said first and second frames from each other so as to activate said switch.

4. A knapsack type working machine according to claim 3, wherein said prime mover is mounted at a prime mover mount position of said first frame by means of a rotary member.

5. A knapsack type working machine having a prime mover designed to be carried on an operator's back and serving as a source of motive power of a working instrument, said working machine comprising:

a first frame for supporting said prime mover; and a second frame being separate from said first frame and having shoulder straps and a back pad, wherein said first frame has a first engagement portion, a second engagement portion vertically spaced from said first engagement portion, and a locking engagement member projecting from said second engagement portion toward said first engagement portion, wherein said second frame has a first engagement portion removably hinged on said first engagement portion of said first frame, a second engagement portion supporting said second engagement portion of said first frame from below, and a locking member pivotally mounted on said second frame and angularly movable between a locking position in which said locking member is interlocked with said locking engagement portion of said first frame to couple together said first and second frames against pivotal movement relative to each other about a common axis of the respective hinged first engagement portions, and a releasing position in which said locking member is disengaged from said locking engagement member of said first frame to allow said second frame to be detached from said first frame in an upward direction by turning said first and second frames relative to each other in a direction to disengage the respective second engagement portions, said locking member being normally disposed in said locking position.

6. A knapsack type working machine according to claim 5, wherein said first frame is made of a pipe material and has a loop-shaped overall configuration including left and right vertical side frame portions and upper and lower horizontal cross frame portions interconnecting said vertical side frame portions at opposite ends thereof, one of said horizontal cross frame portions forming said first engagement portion of said first frame, and the other horizontal cross frame portion forming said second engagement portion of said first frame, and wherein said second frame has a pair of vertically spaced horizontal support stays, one of said support stays forming said first engagement portion of said second frame and the other support stay forming said second engagement portion of said second frame, said one support stay having a channel-shaped configuration and being received between said vertical side frame portions of said first frame with said one horizontal cross frame portion fitted in said channel-shaped one support stay, and said other support stay having a horizontal shelf portion received between said vertical side frame portions of said first frame and supporting thereon said other horizontal cross frame portion.

7. A knapsack type working machine according to claim 6, wherein said horizontal shelf portion has a recessed portion, and said locking engagement member is connected to said other horizontal cross frame portion and is fitted in said recessed portion of said horizontal shelf portion to position said first and second frame.

8. A knapsack type working machine according to claim 6, wherein said second frame has a resilient member disposed between said one horizontal cross frame portion of said first frame and said channel-shaped one support stay of said second frame and also between said other horizontal cross frame portion of said first frame and said horizontal shelf portion of said second frame.

9. A knapsack type working machine according to claim 5, further including a prime mover stopping mechanism for disabling operation of said prime mover upon separation of said first and second frames from each other, said stopping mechanism including a switch disposed on said first frame and operatively connected to said prime mover so as to disable operation of said prime mover when activated, said switch having a detection rod projecting from said first frame toward said second frame and normally engaged with said second frame to keep said switch in a deactivated condition.

10. A knapsack type working machine according to claim 5, wherein said first frame has a horizontal frame portion and a vertical hollow rotary axle rotatably mounted on said horizontal frame portion, and said prime mover is mounted on said horizontal frame portion via said rotary axle and has a wire for controlling operation of said prime mover, said hollow rotary axle having an axial through hole through which said wire extends.

11. A knapsack type working machine according to claim 10, wherein said rotary axle is mounted on said horizontal frame portion of said first by a prime mover supporting plate disposed on said horizontal frame portion via a vibration isolation mount member, and said second frame has a resilient member disposed between the respective first engagement portions of said first and second frames and between the respective second engagement portions of said first and second frames.

12. A knapsack type working machine according to claim 5, wherein said second frame has a resilient member disposed between the respective first engagement portions of said first and second frames and between the respective second engagement portions of said first and second frames.

\* \* \* \* \*

UNITED STATES PATENT AND TRADEMARK OFFICE
CERTIFICATE OF CORRECTION

PATENT NO. : 6,053,259
DATED : April 25, 2000
INVENTOR(S) : Kojima et al.

Page 1 of 1

It is certified that error appears in the above-identified patent and that said Letters Patent is hereby corrected as shown below:

Column 9,
Line 45, "Is" should read -- is --

Column 12,
Line 19, claim 1, before "detecting" insert -- deactivating said switch, said detection rod --
Line 21, claim 1, after "switch" insert -- and disable said prime mover --
Line 61, claim 3, before "detecting" insert -- and disable said prime mover --
Line 63, claim 3, before "detecting" insert -- deactivating said switch, said detection rod --

Column 13,
Line 32, claim 5, "disposed" should read -- resiliently biased --

Signed and Sealed this

Fourth Day of December, 2001

*Attest:*

*Attesting Officer*

NICHOLAS P. GODICI
*Acting Director of the United States Patent and Trademark Office*